Jan. 6, 1925.

G. R. FARRELL 1,521,875

PROCESS OF MAKING TOILET AND SIMILAR ARTICLES OF PYROXYLIN

Filed Nov. 15, 1923   2 Sheets—Sheet 1

Inventor
George R. Farrell
By Attorneys

Patented Jan. 6, 1925.

1,521,875

UNITED STATES PATENT OFFICE.

GEORGE R. FARRELL, OF LEOMINSTER, MASSACHUSETTS, ASSIGNOR, BY MESNE ASSIGNMENTS, TO STANDARD PYROXOLOID CORPORATION, OF LEOMINSTER, MASSACHUSETTS, A CORPORATION OF MASSACHUSETTS.

PROCESS OF MAKING TOILET AND SIMILAR ARTICLES OF PYROXYLIN.

Application filed November 15, 1923. Serial No. 675,007.

*To all whom it may concern:*

Be it known that I, GEORGE R. FARRELL, a citizen of the United States, residing at Leominster, in the county of Worcester and State of Massachusetts, have invented a new and useful Process of Making Toilet and Similar Articles of Pyroxylin, of which the following is a specification.

This invention relates to the production of mirrors, brushes and other articles which have a front and back and a projecting rim all around the edge of a contrasting color or other appearance. The articles thus made are further described and claimed in my copending application, Serial No. 675,008. As heretofore manufactured, the front and back have usually been made of thin sheets of pyroxylin heated and formed to shape while the central projecting rim was made by placing a layer of contrasting celluloid between them throughout their surfaces. While this formed a solid and durable construction it involved the waste of a great deal of pyroxylin material because it was formed entirely of solid sheet stock.

The objects of this invention are to construct an article having the same appearance of comparatively thin sheet material, preferably pyroxylin of one of the thinnest gauges, say for example 40/1000 of an inch in thickness, for the front and back and saving in the material of the rim by using a mere outline thereof. Instead of using a continuous sheet of considerably thicker material for the projecting rim, I make it merely of an outline strip of such material extending around the article. Another object of the invention is to enable me to finish the edge of the projecting sheet material in a very simple manner without cutting back any of the front and back surfaces of the article.

Other objects and advantages of the invention will appear hereinafter.

Reference is to be had to the accompanying drawings, in which—

Figure 1:
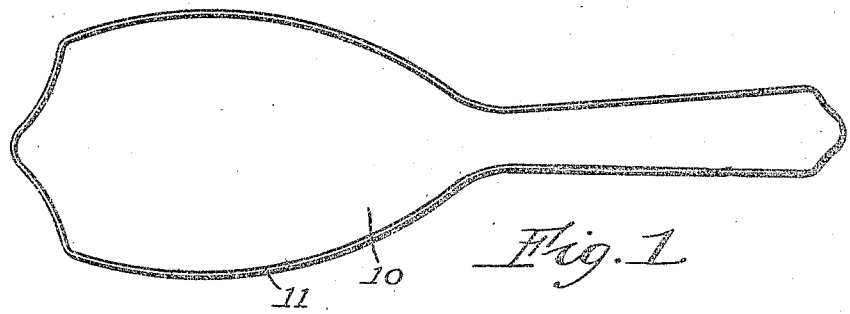
Fig. 1 is a plan of the back of an article constructed in accordance with this invention.
Figure 2:
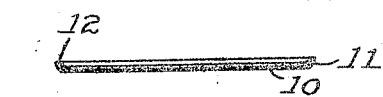
Fig. 2 is a transverse sectional view.

This invention can be applied to the manufacture of brushes, hand mirrors and various other articles. I have shown it as applied to the making of a brush. In the first place, sheet pyroxylin of a thin gauge, as for example of 40/1000 of an inch in thickness, is cut out and shaped up in a die to form a back 10. This back has a perimeter 11 incurved at its edge and extending upwardly at right angles from it so that the top surface 12 of it is flat. In most cases this is located in a plane parallel with the main flat surface of the back 10.

The front 13 of the article is made in the same way of the same shape, except that in the case shown it is provided with perforations at 14 for the brush tufts 15 as will appear later. These may be applied at a later stage in the process.

Figure 3:
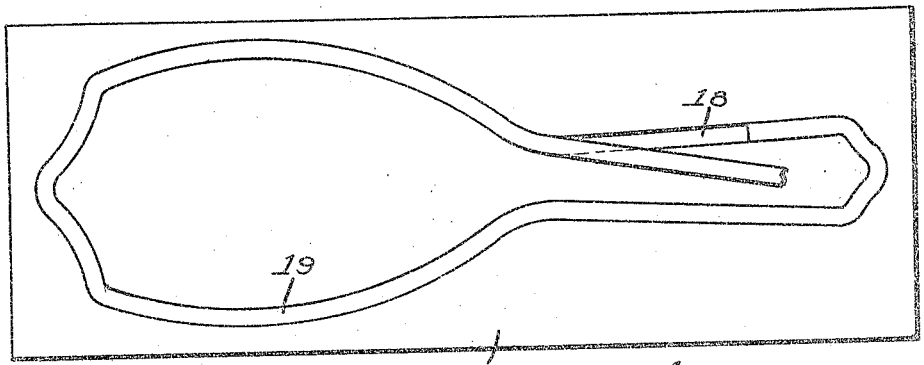
Fig. 3 is a plan of a die with a strip of pyroxylin therein for use in making the intermediate or projecting portion of the article.
Figure 4:
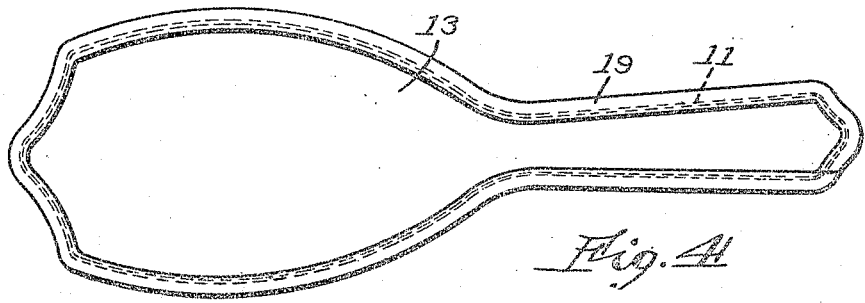
Fig. 4 is a view similar to Fig. 1 showing the other part or front of the article with the strip shown in Fig. 3 applied thereto.
Figure 5:
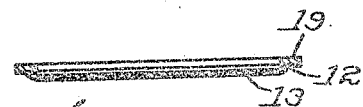
Fig. 5 is a transverse sectional view of the same.
Figure 6:
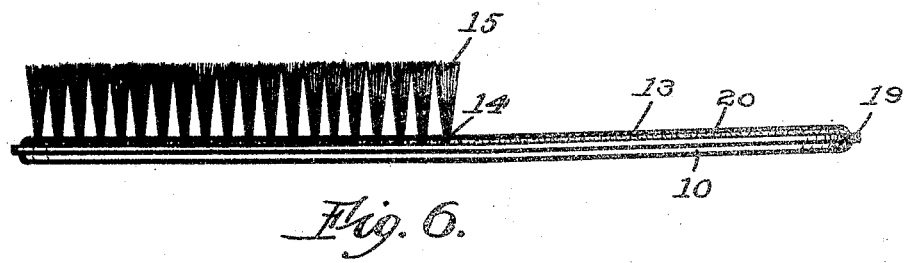
Fig. 6 is an edge view of a hair brush constructed from the parts shown in the first five figures and shown partly in section.
Figure 7:
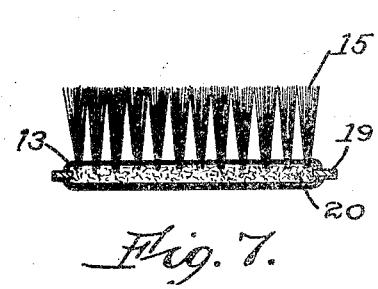
Fig. 7 is a transverse view of the same.
Figure 8:
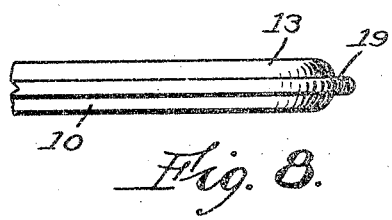
Fig. 8 is an edge view on enlarged scale of a part of the finished article.

In Fig. 3 I have illustrated a die 17 preferably of metal having a groove 18 of the shape of the desired article. In this groove is placed a strip 19 of pyroxylin of a considerable thickness preferably between 1/16 and 1/8 of an inch. It is heated and bent edgewise so as to be received in this groove and then held therein by pressure from a flat die or the like until it is set in this shape. Then the ends are trimmed off to fit each other and cemented together so as to form a continuous closed outline construction. This strip 19 is then cemented along the flat edge 12 of one of the two members 10 and 13 as shown in Fig. 5. Then the other member is cemented on that and the space between is filled with plastic material 20 capable of setting and hardening to form a solid backing for the two members 10 and 13. If brush tufts are to be inserted they are put into the front member before the plastic material is inserted. They project into the space inside and the hardened plasic material 20 holds them in place. This forms an article such as is shown in Figs. 6 and 7. Now the edge of the strip 19 is rounded off all around to give it the desired finish as shown in Fig. 8.

If a mirror is to be made the front member 13 is provided with a depression for receiving it and the glass put into this depression in the usual way which can be done after the plastic material is inserted.

It will be seen that it is a convenient matter to round off the edge of the strip 19 and that the edges of the front and back 10 and 13 are rounded off evenly and accurately in the process of manufacture so that they do not have to be finished in this way. Furthermore, an important advantage is that the rounding off of the strip 19 does not necessitate the cutting back of the front and back 10 and 13 and they do not have to be finished at all. As the plastic material 20 is comparatively cheap, this constitutes a very material saving not only in the front and back but in the central strip 19 as well.

This forms a very attractive article when the front and back are formed of grained or other comparatively plain white pyroxylin and the center strip 19 is made of a contrasting color, as for example, amber, dark blue or the like. The article has the appearance of being formed of solid pyroxylin and has all the weight and strength that it would have if it were so made and is just as durable and valuable in every way.

Although I have illustrated and described only one method of procedure and one article, I am aware of the fact that other articles of many kinds can be made in accordance with this process and that variations in the procedure can be introduced without departing from the scope of the invention as expressed in the claims. Therefore I do not wish to be limited in these respects but what I do claim is:—

1. The method of making an article of the character described which comprises shaping two sheets of thin material into flat form with an incurved perimeter, shaping a narrow flat strip to conform to the outline of said perimeters but larger, uniting it to the incurved perimeter of one sheet so as to project therefrom all around, placing the other sheet on the other side of said strip, uniting it thereto, and filling the space between the two sheets and within said strip with a plastic material capable of hardening.

2. The method of making a toilet article which comprises shaping two sheets of thin material into flat form with an incurved perimeter having a flat surface in a plane parallel to the flat surface of the sheet, bending in a die a narrow flat strip in a plane to conform to the outline of said perimeters but larger, uniting it to the incurved perimeter of one sheet so as to project uniformly therefrom, placing the other sheet on the other side of said strip, uniting it thereto, and filling the space between the two sheets with a plastic material capable of hardening.

3. The method of making an article of the character described, which consists in forming a front and back of thin sheet pyroxylin, bending their perimeters outwardly from the plane thereof, inserting a narrow strip of sheet pyroxylin of a similar outline and contrasting color between the edges of the back and front, said strip being of larger outline than the back and front so as to project therefrom all around, filling the space between the back and front with plastic material, and rounding the projecting edge of the intermediate strip.

4. The method of making a hair brush, which consists in forming a front and back of thin sheet pyroxylin, carrying their perimeters outwardly from the plane thereof to terminate in a parallel plane, forming perforations through the front, placing tufts of bristles in the perforations so they project through, inserting a thicker narrow strip of sheet pyroxylin of a similar outline and contrasting color between the flat edges of the back and front so as to project therefrom all around, filling the space between the back and front and surrounding the inwardly projecting bristles with a single body of plastic material, and finishing the projecting edge of the intermediate strip.

5. The method of making an article of the character described which comprises shaping two sheets of thin material into flat form with an incurved perimeter, shaping a flat sheet to conform to the outline of said perimeters but larger, uniting it to the incurved perimeter of one sheet so as to project therefrom all around, placing the other sheet on the other side of said strip, uniting it thereto and filling the space between the two sheets with a plastic material capable of hardening.

6. The method of making an article of the character described which comprises shaping two sheets into flat form, shaping a narrow flat strip to conform to the outline of said perimeters but larger, uniting it to one sheet so as to project therefrom all around, placing the other sheet on the other side of said strip, uniting it thereto, and filling the space and within said narrow strip with a plastic material capable of hardening.

In testimony whereof I have hereunto affixed my signature.

GEORGE R. FARRELL.